United States Patent Office 3,282,868
Patented Nov. 1, 1966

3,282,868
HORTICULTURE CONTAINER-COMPOSITION AND PROCESSES
Daniel C. Frysinger, Glen Mills, and Oliver R. Odhner, West Grove, Pa., assignors to Rhoads Molded Products, Inc., Wilmington, Del., a corporation of Delaware
No Drawing. Filed Feb. 5, 1964, Ser. No. 342,817
2 Claims. (Cl. 260—17.3)

This invention relates to a new composition and process for producing a molded horticulture container. More specifically, it deals with a process for producing a new molded composition for making horticulture containers which are light weight, water resistant, strong, fracture resistant, porous and water permeable and free from adversely affecting the plants by burning.

In the past, receptacles have been produced by molding containers of synthetic resin and filler and later either physically or chemically removing substances to produce fine capillary canals in the mold. With the present invention, it is possible to mold the container and at the same time achieve the porosity desired without the necessity of subsequently treating the molding product.

In prior processes it was necessary to perform a separate step for making the filler material water resistant. In the process of the instant invention this quality is achieved in the mixing step so that a molded container results which is both water resistant and water permeable.

Processes used for molding horticulture containers in the past were not only very involved, requiring several steps, but also containers produced by the processes were sometimes harmful to the plants. It has been found that excess formaldehyde in the horticulture container causes burning of the plants, particularly in places where there is little or no ventilation as, for example, greenhouses.

It is an object of the present invention to produce a horticulture container which has unusual advantages as to propagation of seeds and growth of plant life.

Another object is to produce a new molded product which is strong, light weight, porous, fracture resistant and which will not cause burning of the plants.

A further object of the instant invention is to provide a new molding composition and process for producing horticulture containers.

Another object is to provide a horticulture container of cellulose and a thermosetting formaldehyde resin which will not cause burning of the plants.

A still further object of the instant invention is to provide a process of preventing the burning of plants from free formaldehyde in horticulture containers by the use of specific catalysts and free urea.

Other objects and advantages of the instant invention will be more apparent from the following detailed description and example:

The containers or horticulture receptacles of the present invention are molded from cellulose material such as wood sawdust bonded with a thermosetting formaldehyde resin glue containing a wax emulsion, ammonium chloride, ammonium nitrate and urea along with a small percentage of a parting agent, water, and iron oxide. The formaldehyde resins used are of the amino type such as urea formaldehyde, thio urea formaldehyde and melamine formaldehyde or of the phenol type such as phenol formaldehyde, cresol formaldehyde, xylenol formaldehyde and resorcinol formaldehyde.

The preferred thermosetting resin used in the present invention is urea formaldehyde, mainly because of its ready availability and its low cost, although, as indicated, other resin can be used in the molding composition. The urea formaldehyde is preferably used in the liquid form in the ratio of formaldehyde to urea of between 1.1 to 1 and 1 to 1. The ratio of formaldehyde to urea is critical because the greater the ratio than 1.1 to 1, the greater the probability of plant damage and below a mole ratio of 1 to 1 the resin is soluble and the pot would disintegrate. As much as 5% ammonium chloride and 0.5% ammonium nitrate by weight based on the weight in the liquid urea formaldehyde (containing 75% solids and not including the free added urea) is added to prevent burning of the plants. The ratio of ammonium nitrate to ammonium chloride should always be about 1 to 10.

In addition, a small percentage of urea powder is added to the composition serving to combine with any free formaldehyde that is released from the molding composition during the molding operation. The added urea is prepared by mixing urea powder with water and heating. The addition of the urea changes the ratio of commercial urea formaldehyde which is usually more than 1.5 to 1 to the desired ratio of between 1.1 to 1 and 1 to 1. If desired, coloring matter may be added to the molding composition before the molding takes place. The containers may be colored by the addition of suitable coloring compounds to contrast with the contents of the containers. The containers may be also made resistant to mildew by the addition of suitable fungicides to the molding mix prior to the molding operation. The improved receptacles, in addition to being very light in weight, are resistant to fracture and are very porous. The containers of the present invention are more porous than clay pots or receptacles used in the horticulture field but do not allow the moisture of the soil retained in the container to evaporate as quickly as such evaporation would take place in a clay container. This evaporation in clay receptacles causes a refrigerating effect on the soil therein which tends to lower the temperature of the soil and act as a deterrent on the growth of the plant, whereas in the improved container the change of temperature after watering the plant retained in this container in very much less marked and the root growth of the plant contained in this container is accelerated.

The containers of the instant invention are molded from a composition containing approximately 60–90% cellulose such as wood sawdust, and 10–40% glue which includes the formaldehyde resin, urea, wax, coloring material, catalysts, parting agent, etc.

A typical example of the molding composition for producing the horticulture containers is as follows:

| | Percent solids |
|---|---|
| Sawdust | 80.00 |
| Urea formaldehyde | 11.41 |
| Wax emulsion | 3.54 |
| Ammonium chloride | 0.76 |
| Ammonium nitrate | 0.08 |
| Iron oxide | 1.17 |
| Urea | 3.03 |
| Cetyl trimethyl ammonium bromide (CTAB) | 0.01 |
| | 100.00 |

The above composition was prepared in the following manner: The sawdust was run through a hammermill with an ⅛ inch screen after having been dried to a moisture content of between 2% and 5%.

The liquid urea formaldehyde is the commercial grade available for chipboard manufacture which has a mole ratio of formaldehyde to urea of 1.6 to 1 and with 75% solids.

The wax emulsion has 45% solids and the wax is a low grade paraffin with a melting point of 125° F.

The iron oxide, ammonium chloride and ammonium nitrate and urea are commercially available grades. It is important that the ratio of ammonium nitrate to ammonium chloride is 1 to 10. The urea is prepared by mixing with water and heating but the urea may be dissolved into the wax emulsion and thus the addition of extra water can be obviated.

The above ingredients were mixed in the following manner:

Mixture A:                              Parts by weight
   Liquid urea formaldehyde _____ 15.21
   Iron oxide _____ 1.17
   Water _____ 1.52
   CTAB _____ 0.01

In another container was mixed the following, some steam being helpful since the dissolving of the urea is endothermic:

Mixture B:                              Parts by weight
   Wax emulsion _____ 7.87
   $NH_4Cl$ _____ 0.76
   $NH_4NO_3$ _____ 0.08
   Urea _____ 3.03

Mixture A and Mixture B were combined just prior to the mixing of the resinous material with the sawdust:

Mixture A _____ 17.91
Mixture B _____ 11.74

This combination was then mixed with the dry sawdust and run through the mixer:

Parts by weight
Mixture A and B combined _____ 29.65
Sawdust _____ 82.40

The total time required for the mixing of A and B and molding was 1 minute. Depending on the desired density the molding temperatures and pressures may vary from 200 to 350° F. and from 600 to 3500 pounds per square inch. The time for molding can run between 1 and 6 minutes.

Pots formed by the above process were then tested and gave the following results:

| Results | 1 day | 2 days | 3 days |
|---|---|---|---|
| Pot 1 | Neg. Burn | Neg. Burn | Neg. Burn |
| Pot 2 | Neg. Burn | Neg. Burn | Neg. Burn |
| Pot 3 | Neg. Burn | Neg. Burn | Neg. Burn |

The following table shows the result of tests made on pots not containing any $NH_4NO_3$, even after they were vented and postcured for one week at 120° F.

| Results | 1 day | 2 days | 3 days |
|---|---|---|---|
| Pot 1 | 10% Burn | 10% Burn | 10% Burn |
| Pot 2 | Neg. Burn | 10% Burn | 10% Burn |
| Pot 3 | Neg. Burn | 10% Burn | 10% Burn |

Pots in which no free urea or $NH_4NO_3$ were added totally burned the plants.

The porosity of the pots is such that if a drop or two of detergent is placed in the inside of the pot and one blows from the outside, bubbles will be produced.

The flower pots of applicants' invention have been found to be very tough, notwithstanding their lightness and to be of good porosity, requiring less watering of the plants or seeds contained therein.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

We claim:

1. A process of producing a horticulture container comprising forming a first mixture of 15.21% liquid urea formaldehyde, 1.17% iron oxide, 1.52% water and 0.01% cetyl trimethyl ammonium bromide, forming a second mixture of 7.87% wax emulsion, 0.76% ammonium chloride, 0.08% ammonium nitrate and 3.03% urea wherein the ratio of urea to formaldehyde is between 1.1 to 1 and 1 to 1, forming a third mixture by mixing said first mixture with said second mixture and finally mixing said third mixture with 82.40% sawdust, all of said percentages being by weight of the composition, and molding at a temperature of from 200 to 350° F. and a pressure of from 600 to 3500 pounds per square inch.

2. A horticulture container which is lightweight, strong, water-resistant, fracture-resistant, porous, water-permeable, free from adversely affecting the plants by burning and requiring less watering of the plants, consisting essentially of 80% sawdust, 11.41% liquid urea formaldehyde, said urea formaldehyde having 75% solids and a ratio of formaldehyde to urea of 1.6 to 1, 3.54% of a low grade paraffinwax emulsion, said wax having a melting point of 125° F., 1.17% iron oxide, 0.76% ammonium chloride, 0.01% cetyl trimethyl ammonium bromide, 3.03% free urea powder, said urea powder changing the ratio of urea to formaldehyde from 1.6 to 1 to between 1.1 to 1 and 1 to 1, and 0.08% ammonium nitrate, said free urea and ammonium nitrate preventing burning of said plants by reacting with and combining with free formaldehyde released during the molding, said percentages being by weight of the composition.

References Cited by the Examiner

UNITED STATES PATENTS

| | | | |
|---|---|---|---|
| 2,679,490 | 5/1954 | Meiser et al. | 260—17.3 |
| 2,764,569 | 9/1956 | Emerson | 260—17.3 |
| 3,006,879 | 10/1961 | Ryan et al. | 260—17.3 |
| 3,174,940 | 3/1965 | Lacoste | 260—17.3 |

OTHER REFERENCES

Chemical Abstracts, vol. 43, 5226b.

SAMUEL H. BLECH, *Primary Examiner.*

WILLIAM H. SHORT, *Examiner.*

E. M. WOODBURY, *Assistant Examiner.*